US010007052B2

(12) United States Patent
Gubser et al.

(10) Patent No.: US 10,007,052 B2
(45) Date of Patent: Jun. 26, 2018

(54) METHOD FOR MANUFACTURING WAVEGUIDE STRUCTURES ON WAFER-LEVEL AND CORRESPONDING WAVEGUIDE STRUCTURES

(71) Applicant: Heptagon Micro Optics Pte. Ltd., Singapore (SG)

(72) Inventors: Simon Gubser, Weesen (CH); Frank Sobel, Rixheim (FR); Alexander Bietsch, Thalwil (CH); Jens Geiger, Thalwil (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days. days.

(21) Appl. No.: 15/014,244

(22) Filed: Feb. 3, 2016

(65) Prior Publication Data
US 2016/0223746 A1 Aug. 4, 2016

Related U.S. Application Data

(60) Provisional application No. 62/152,331, filed on Apr. 24, 2015, provisional application No. 62/111,708, filed on Feb. 4, 2015.

(51) Int. Cl.
*F21V 8/00* (2006.01)
*B29D 11/00* (2006.01)

(52) U.S. Cl.
CPC ...... *G02B 6/0065* (2013.01); *B29D 11/00663* (2013.01)

(58) Field of Classification Search
CPC .. G02B 6/3853; G02B 6/3839; G02B 6/0065; G02B 6/2552; B29D 11/00663
See application file for complete search history.

(56) References Cited

U.S. PATENT DOCUMENTS 6,087,653 A 7/2000 Van Schyndel et al.
6,123,463 A * 9/2000 Kashihara ............ G02B 6/3821
385/59

(Continued)

FOREIGN PATENT DOCUMENTS

DE 197 00 836 C1 5/1998
EP 2 579 077 4/2013

(Continued)

OTHER PUBLICATIONS

Guo et al., "Topical Review; Recent progress in nanoimportant technology and its applications; Topical Review", Journal of Physics D: Applied Physics, Institute of Physics Publishing Ltd. GB, pp. R123-R141 (2004).

*Primary Examiner* — John M Bedtelyon
(74) *Attorney, Agent, or Firm* — Fish & Richardson P.C.

(57) ABSTRACT

The waveguide structure can be manufactured on wafer-scale and comprises a holding structure and a first and a second waveguides each having a core and two end faces. The holding structure comprises a separation structure being arranged between the first and the second waveguide and provides an optical separation between the first and the second waveguide in a region between the end faces of the first and second waveguides. A method for manufacturing such a waveguide structure with at least one waveguide comprises shaping replication material by means of tool structures to obtain the end faces, hardening the replication material and removing the tool structures from a waveguide structures wafer comprising a plurality of so-obtained waveguides.

22 Claims, 10 Drawing Sheets

(56) References Cited

U.S. PATENT DOCUMENTS

| | | |
|---|---|---|
| 8,417,078 B2 | 4/2013 | Riester et al. |
| 2003/0094566 A1 | 5/2003 | Hamalainen et al. |
| 2007/0228263 A1 | 10/2007 | Shen et al. |
| 2008/0210851 A1 | 9/2008 | Arnold |
| 2009/0033937 A1 | 2/2009 | Oh et al. |
| 2009/0062661 A1 | 3/2009 | Oh et al. |
| 2009/0278033 A1 | 11/2009 | Lin et al. |
| 2012/0238320 A1 | 9/2012 | Kido |
| 2013/0292052 A1 | 11/2013 | Jeong et al. |

FOREIGN PATENT DOCUMENTS

| | | |
|---|---|---|
| EP | 2 584 705 A1 | 4/2013 |
| WO | 2012/000500 | 1/2012 |
| WO | 2012/071674 | 6/2012 |
| WO | 2013/049948 | 4/2013 |

* cited by examiner

METHOD FOR MANUFACTURING WAVEGUIDE STRUCTURES ON WAFER-LEVEL AND CORRESPONDING WAVEGUIDE STRUCTURES

INCORPORATION BY REFERENCE

The present patent application hereby incorporates by reference U.S. provisional application Ser. No. 62/111,708 filed with the USPTO on Feb. 04, 2015.

The invention relates to the field of optics, and in particular to methods for manufacturing optical components, specifically waveguides and related structures, on wafer level.

DEFINITION OF TERMS

"Active optical component": A light sensing or a light emitting component. E.g., a photodiode, an image sensor, an LED, an OLED, a laser chip. An active optical component can be present as a bare die or in a package, i.e. as a packaged component.

"Passive optical component": An optical component redirecting light by refraction and/or diffraction and/or (internal and/or external) reflection such as a lens, a prism, a mirror (plane or curved), optical filter, or an optical system, wherein an optical system is a collection of such optical components possibly also comprising mechanical elements such as aperture stops, image screens, holders.

"Opto-electronic module": A component in which at least one active and at least one passive optical component is comprised.

"Replication": A technique by means of which a given structure or a negative thereof is reproduced. E.g., etching, embossing (imprinting), casting, molding.

"Wafer": A substantially disk—or plate-like shaped item, its extension in one direction (z-direction or vertical direction or stacking direction) is small with respect to its extension in the other two directions (x- and y-directions or lateral directions). For example, on a (non-blank) wafer, a plurality of like structures or items are arranged or provided therein, for example, on a rectangular grid. A wafer may have openings or holes, and a wafer may even be free of material in a predominant portion of its lateral area. A wafer may have any lateral shape, wherein round shapes and rectangular shapes are very common. Although in many contexts, a wafer is understood to be prevailingly made of a semiconductor material, in the present patent application, this is explicitly not a limitation. Accordingly, a wafer may be made of, e.g., a semiconductor material, a polymer material, a composite material comprising metals and polymers or polymers and glass materials. Further, a wafer may be made of hardenable materials such as thermally or UV-curable polymers.

"Lateral": cf. "Wafer"

"Vertical": cf. "Wafer"

"Light": Most generally electromagnetic radiation; more particularly electromagnetic radiation of the infrared, visible or ultraviolet portion of the electromagnetic spectrum.

From WO 2012/071674 and from WO 2013/049948, methods for manufacturing optical components, in particular optical waveguides, on wafer-level are known.

One object of the invention is to create waveguides of particularly high optical quality, in particular waveguides having end faces (at which light is coupled into or out of the waveguide) of particularly good quality. Specifically, the end faces shall be as defect-free as possible and very smooth.

Another object of the invention is to efficiently manufacture high numbers of waveguides.

Another object of the invention is to create waveguide structures comprising at least one waveguide which can be safely handled during their manufacture and afterwards, e.g., when the waveguide structures are integrated into a device.

Another object of the invention is to provide ways to manufacture on wafer-level waveguide structures which comprise a holding structure for simplifying and/or for making safer the handling of the waveguide structures.

Wafer-scale manufacture makes possible to manufacture a large number of, for example, congeneric items with very high efficiency, in particular by subsequently and thus repeatedly applying the same processing step to each of the items comprised in a wafer, or by simultaneously applying one and the same processing step to all of the items comprised in the wafer.

Further objects and various advantages emerge from the description and embodiments below.

At least one of these objects is at least partially achieved by apparatuses and methods according to the patent claims.

The invention has emerged from the desire to efficiently produce high numbers of optical waveguides, wherein end faces of the waveguides were meant to be of high optical quality. Flaws at the end faces such as they would emerge in a molding process at places where two molds would be in contact with each other would deteriorate the required optical quality. And furthermore, polishing of the waveguide end faces was intended to be avoided, as it would be difficult and/or time consuming to achieve the desired optical quality, and in addition, polishing non-planar end faces would pose a challenge in wafer-level manufacture.

A further aspect which has inspired the inventors was the intention to avoid having to touch the waveguides during their manufacture and/or afterwards, when integrating the waveguides in further devices.

The inventors developed a method in which waveguide structures are produced which comprise at least one waveguide and, in addition, a holding structure (to which the one or more waveguides of the waveguide structures adhere), wherein end faces of the waveguides are shaped in a replication process by means of tool structures which are removed after the manufacture, e.g., after replication material from which the waveguides are formed has been shaped and hardened to a sufficient extent.

A waveguide structures wafer can be obtained this way which comprises a plurality of the waveguide structures, wherein the end faces of the waveguides are of high optical quality.

Besides the manufacturing method, the invention also comprises the waveguide structures themselves—which can inherit properties of corresponding manufacturing methods.

Some aspects of the invention may come in two different variants, wherein the first variant involves repeating certain process steps a plurality of times, for example, once for the manufacture of each of the waveguide structures finally present in the waveguide structures wafer, whereas in the second variant, certain process steps are—in contrast to the first variant—accomplished simultaneously for typically each of the waveguide structures finally present in the waveguide structures wafer.

Furthermore, a first and a second example are described, wherein in the second example, waveguide structures comprising two waveguides each may be produced which are, in the waveguide structures wafer, arranged in different planes parallel to the plane of the waveguide structures wafer (lateral plane). In the first example, waveguide structures comprising two waveguides each may be produced which are, in the waveguide structures wafer, arranged in one and the same plane parallel to the plane of the waveguide structures wafer. In the second example, a carrier wafer (from which the holding structures are obtained) has one or more hollows (a hollow structure or channel structure) for the replication process. In the first example, a carrier wafer (from which the holding structures are obtained) has one or more indentations (a hollow structure or channel structure) for the replication process. More details concerning the two example are described farther below.

The method specifically is a method for manufacturing a plurality of waveguide structures, each of the waveguide structures comprising a holding structure and a first waveguide having a core comprising two end faces. The waveguide can be arranged adjacent to the holding structure. The waveguide and the holding structure can be mutually adherent.

The method comprises
  providing a carrier wafer comprising a plurality of carrier structures.

As will become clear, the carrier structures are used for a replication-based manufacture of the waveguide structures, such that they can have surfaces corresponding to a negative of surfaces of waveguides to be manufactured, but not of end faces of waveguides.

And in a first variant, the method comprises
  providing a replication tool comprising at least one first tool structure comprising two end face structures;
  repeating a plurality of times the step of shaping replication material present between the carrier wafer and the replication tool by the at least one first tool structure and by one of the plurality of carrier structures, wherein each of the plurality of times,
    the replication material is shaped by another one of the plurality of carrier structures and by the at least one first tool structure; and
    the replication material present at the end face structures is shaped by the end face structures.

In a second variant, the method comprises
  providing a replication tool wafer comprising a plurality of first tool structures, each of the first tool structures comprising two end face structures;
  bringing together the carrier wafer and the replication tool wafer;
  shaping replication material present between the carrier wafer and the replication tool wafer by the carrier structures and by the first tool structures, wherein the replication material present at the end face structures is shaped by the end face structures.

As will become clear, in both, the first and the second variant, the at least one first tool structure is used for a replication-based manufacture of the waveguide structures, such that it can have surfaces corresponding to a negative of surfaces of a waveguide to be manufactured, for example of end faces of a waveguide—which are shaped by the end face structures. Each end face structure can comprise a continuous surface for shaping a corresponding end face in full; flaws such as molding lines or casting lines at the end faces can be avoided.

And furthermore, the method comprises
  hardening the shaped replication material to obtain a waveguide structures wafer comprising the plurality of first waveguides, the carrier structures establishing the holding structures, the shaped and hardened replication material establishing the cores of the first waveguides, the hardened replication material present at and shaped by the end face structures establishing the end faces of the cores of the first waveguides;
  removing, in the first variant the replication tool, and, in the second variant the replication tool wafer, from the shaped and hardened replication material, the shaped and hardened replication material adhering to the holding structures.

This way, wafer-level manufacturing of waveguide structures can be accomplished.

The waveguide structures can be congeneric waveguide structures.

And the carrier structures can be congeneric carrier structures.

The first (and further) waveguides can in particular be optical waveguides or waveguides for light: They can also be considered light guides or light pipes.

The core (and further cores, too, if present) are transparent for light in an operating wavelength range of the respective waveguide. This can be, e.g., in the infrared (IR) range.

The replication material can be a liquid or at least deformable during the shaping (before hardening).

In the first variant, the step of hardening can be composed of a plurality of subsequent hardening steps (the repeated hardening steps).

And, in the first variant, the removing step can be composed of a plurality of subsequent removing steps (the repeated removing steps). And the first variant can comprise repeatedly the bringing together the carrier wafer and the replication tool.

In the first variant, the replication tool can be structured for simultaneously shaping no more than only a single waveguide structure in some implementations, while in other implementations the replication tool can be structured for simultaneously shaping multiple waveguide structures, in particular two waveguide structures or, e.g., three or four waveguide structures, or more waveguide structures.

In the second variant, on the other hand, the replication tool wafer can be structured for simultaneously shaping the plurality of waveguide structures, which typically results in a very rapid manufacture of waveguide structures.

In the step of bringing together the carrier wafer and the replication tool wafer, each of the carrier structures can be aligned with an associated first tool structure.

In said step of bringing together, the carrier wafer and the replication tool wafer can be brought into contact with each other.

In the step of removing, the replication tool and the replication tool wafer, respectively, can remain intact, e.g., there is no decomposition or dissolution thereof. Thus the replication tool and the replication tool wafer, respectively, are reusable.

After the step of hardening the shaped replication material, the waveguide structures wafer can be separated, e.g., diced, so as to typically obtain singularized waveguide structures; but it is also possible that arrangements of waveguide structures are obtained by the separation.

In such a separating step, the waveguides can be left untouched, i.e. are not cut.

In particular, the end faces of the cores are not shaped in a cutting step such as during separating, but are shaped by the end face structures, as has been explained above. Accordingly, the end faces can have a very high (optical) quality—which would usually not be achievable in a cutting step; and subsequent polishing steps for achieving a desired high (optical) quality, which can be time-consuming and cumbersome, can be avoided.

The end face structures feature surfaces having a shape corresponding to a negative of a shape of surfaces of the end faces.

In the first variant, the replication material can be applied to one or both of the carrier wafer (more specifically to the carrier structures) and the replication tool (more specifically to the at least one first tool structure) by means of a dispensing process.

In the first variant, the shaping of the replication material may, e.g., be accomplished using embossing.

Also in the second variant, the shaping of the replication material may be accomplished using embossing. And in this case, the replication material is typically applied to one or both of the carrier wafer (more specifically to the carrier structures) and the replication tool wafer (more specifically to the first tool structures) by means of a dispensing process.

However, alternatively, in the second variant, the application of the replication material and the shaping of the replication material may be accomplished by means of a vacuum injection molding process. Accordingly, in this case, the carrier wafer and the replication tool wafer are brought together, and a vacuum is applied for sucking the replication material into spaces formed between the carrier wafer and the replication tool wafer and more specifically into cavities thereby formed which correspond to a negative of the shapes of the cores.

In one embodiment, during the shaping of the replication material, the end face structures are present within a channel structure of the carrier wafer established by the carrier structures. It may in particular be provided that the end face structures are present at one or more protrusions protruding into the channel structure, wherein the one or more protrusions are, in the first variant one or more protrusions of the replication tool and, in the second variant one or more protrusions of the replication tool wafer.

The channel structure can comprise one or more open channels.

It is noted that a channel may be but not necessarily is circumferentially completely enclosed by material.

The channel structure may be, e.g., an indentation structure comprising one or more indentations (wherein the indentations do not completely traverse the carrier wafer). Alternatively, the channel structure may be an opening structure of one or more openings extending completely through the carrier wafer.

In one embodiment, each of the plurality of first waveguides comprises more than two end faces. Such waveguides can be, e.g., Y-shaped waveguides.

In one embodiment, at least one of the two end faces of each of the plurality of first waveguides is non-planar. In particular it may be provided that one or more of the end faces establish a lens each, e.g., a refractive lens or a diffractive lens or a refractive-and-diffractive lens. This is readily accomplished by providing correspondingly shaped end face structures. The provision of a lens can add a valuable feature to the waveguide and the waveguide structure, respectively.

In one embodiment, the shaping of the replication material comprises inserting the replication material between the carrier wafer and, in the first variant the replication tool, and in the second variant the replication tool wafer, by application of a vacuum. In particular, the method may comprise accomplishing the shaping of the replication material by means of vacuum injection molding.

In another embodiment, the shaping of the replication material comprises applying the replication material to at least one of
the carrier wafer; and
in the first variant the replication tool, and in the second variant the replication tool wafer.

This may be accomplished, e.g., using a dispenser. In particular, the method may comprise accomplishing the shaping of the replication material by means of embossing.

In one embodiment, the holding structures are at least in part made of a non-transparent material. "Non-transparent" means non-transparent for light having a wavelength in an operating wavelength range of the waveguide, which may, e.g., be a range in the infrared part of the spectrum.

In one embodiment, the waveguide structure comprises the holding structure in addition to the first and second waveguides. E.g., neither is a part of one of the waveguides included in the holding structure, nor is a part of the holding structure included in one of the waveguides.

In one embodiment, at most a portion of the cladding of one or both of the first and second waveguides is established by the holding structure.

In one embodiment, each of the first waveguides comprises a cladding surrounding the core of the respective waveguide, in particular wherein a portion of the cladding is established by the respective holding structure.

The cladding is provided for reflecting (at least in part) back into the core light which propagates inside the respective waveguide and reaches an interface between the core and the cladding.

The cladding may comprise reflective material and/or material having an index of refraction which is lower than an index of refraction of the core (in the operating wavelength range). In one embodiment the cladding essentially is said reflective material and/or said material having said index of refraction.

E.g., the holding structure may be made of a material having an index of refraction which is lower than an index of refraction of the core (in the operating wavelength range). This way, the holding structure would establish the cladding or a part of the cladding (without having to be coated).

E.g., the holding structure may be made of a reflective material or comprise a coating of a reflective material (reflective for light in the operating wavelength range).

E.g., the holding structure may comprise a coating of a material having an index of refraction which is lower than an index of refraction of the core (in the operating wavelength range); and optionally, it may comprise, in addition, a reflective coating below the low-refractive-index material.

In one embodiment, the cladding comprises in addition, for each of the first waveguides, another cladding portion, which is established by a coating applied to the respective core, in particular wherein the coating is a reflective coating or features an index of refraction which is lower than an index of refraction of the core (for light in the operating wavelength range)

In one embodiment, the method comprises manufacturing the carrier wafer using a replication technique. In particular, the manufacture of the carrier wafer may comprise carrying out an embossing step (or even a multitude of embossing steps). Or the manufacture of the carrier wafer may comprise carrying out an injection molding step.

In one embodiment, the carrier wafer comprises a dimensionally stable base wafer and a first tape layer arranged between the base wafer and the carrier structures. The first tape layer can be removable from the base wafer, and it can be resilient. It can be adherent to both, the base wafer and the carrier structures.

In this case, the method comprises after the step of removing the replication tool (in the first variant) and the replication tool wafer (in the second variant) from the shaped and hardened replication material the steps of
attaching a second tape layer to the carrier structures to sandwich the carrier structures between the first and second tape layers; and
removing the base wafer from the first tape layer; and
subsequent thereto,
removing the first tape layer from the carrier structures.

This way, that side of the wafer to which previously the first tape layer was adhering may be exposed and may be subjected to further processing such as to a polishing step.

The base wafer may in particular be a blank wafer, more particularly a solid glass wafer.

Furthermore, it may be provided that each of the carrier structures comprises a base structure separating the respective first waveguide from the first tape layer, in particular wherein the base structures are separate from each other or are contiguous. And the method may in this case comprise reducing a thickness of the base structures after the removing of the first tape layer from the carrier structures. The reducing of the thickness may in particular be accomplished by polishing. However, other ways of removing such material portions may be accomplished, in particular after removal of the first tape layer.

Said thickness reducing step may make possible to remove material portions protruding laterally beyond any of the end faces. Such material portions may arise, at least in part, from coating steps applied during manufacture of the carrier wafer and/or from one or more replication steps in which waveguide cores are manufactured.

The base structure will be removed by the thickness reducing step, in some implementations in part only, in other implementations in full. Thus, the base structures protect the first waveguides during the step of removing said material portions, so as to avoid a removal of material of the first waveguide during the thickness reducing step.

The described method is well suitable for manufacturing waveguide structures comprising two or more waveguides each, as will be described below.

In one embodiment, each of the plurality of waveguide structures comprises, in addition to the first waveguide, a second waveguide, wherein respective first and second waveguides are arranged on one and the same side of the base wafer. And more particularly, each of the carrier structures may comprise a separating structure laterally separating associated first and second waveguides, wherein the separating structures may, e.g., be made, at least in part, of a non-transparent material.

Each of such separating structures may provide an optical separation of the first and second waveguides in a region (laterally) between the end faces of the first and second waveguides.

In one embodiment, the carrier structures comprise at least two slits extending through the carrier wafer, and at least a portion of each of the plurality of waveguides extends from one of the slits to another. The slits may be, e.g., aligned parallel to each other.

With reference to the above, the slits may be comprised in the channel structure described before.

The carrier wafer may be, e.g., a wafer or a wafer stack which is unstructured (blank) except for the slits.

Referring to the last-mentioned embodiment, the first tool structures may in particular protrude into the slits.

It may be provided that, in the first variant,
the first tool structure comprises at least two protrusions comprising one of the end face structures each, and each of which, during the shaping of the replication material, extends into one of the at least two slits;

in the second variant,
each of the first tool structures comprises at least two protrusions comprising one of the end face structures each, and each of which, during the shaping of the replication material, extends into one of the at least two slits.

Furthermore, in one embodiment, in the first variant
the replication tool is a two-part tool comprising two separate parts, and the first tool structure is a two-part tool structure, a first part of the replication tool comprising a first part of the first tool structure, and a second part of the replication tool comprising a second part of the first tool structure, wherein during the shaping of the replication material, a first part of the replication material is shaped by the first part of the first tool structure, and a second part of the replication material is shaped by the second part of the first tool structure, wherein the first and second parts of the replication material are arranged on opposite sides of the carrier wafer; and wherein in the second variant,
the replication tool wafer is a two-part wafer comprising two separate partial wafers, and each of the first tool structures is a two-part tool structure, a first partial wafer of the replication tool wafer comprising a plurality of first parts of the first tool structures, and a second partial wafer of the replication tool wafer comprising a plurality of second parts of the first tool structures, wherein during the shaping of the replication material, a first part of the replication material is shaped by the first parts of the first tool structures, and a second part of the replication material is shaped by the second parts of the first tool structures, wherein the first and second parts of the replication material are arranged on opposite sides of the carrier wafer.

In one embodiment, each of the plurality of waveguide structures comprises, in addition to the first waveguide, a second waveguide, wherein each of the carrier structures comprises a separating structure vertically separating associated first and second waveguides, in particular wherein the separating structures are made, at least in part, of a non-transparent material. The separating structures can be comprised in the holding structures.

Associated first and second waveguides are in this case arranged on opposite sides of the carrier wafer.

Each of the separating structures may provide an optical separation of the first and second waveguides in a region (laterally) between the end faces of the first and second waveguides In general, it can be provided that each of the waveguides extends generally along lateral directions.

In one embodiment, each of the plurality of waveguide structures comprises, in addition to the first waveguide, a second waveguide, in particular wherein the first and the second waveguide run parallel to each other.

In one embodiment, each of the second waveguides having a core comprising two end faces, wherein in the first variant the replication tool comprises, in addition, at least one second tool structure comprising two further end face structures, wherein the step of shaping the replication material comprises in the first variant shaping the replication material present between the carrier wafer and the replication tool by the at least one first tool structure and by the at least one second tool structure and by one of the plurality of carrier structures, wherein each of the plurality of times of repeating the step of shaping the replication material comprises shaping the replication material by another one of the plurality of carrier structures and by the at least one first tool structure and by the at least one second tool structure; and shaping a portion of the replication material present at the end face structures by the end face structures of the first tool structures and shaping another portion of the replication material present at the further end face structures by the further end face structures; and wherein in the second variant the replication tool wafer comprises, in addition, a plurality of second tool structures comprising two further end face structures each, and wherein the step of shaping the replication material comprises in the second variant shaping the replication material present between the carrier wafer and the replication tool wafer by the carrier structures and by the first tool structures and by the second tool structures, wherein portions of the replication material present at the end face structures are shaped by the end face structures, and portions of the replication material present at the further end face structures are shaped by the further end face structures.

And the waveguide structures wafer comprises, in addition to the plurality of first waveguides, a plurality of the second waveguides, and wherein the shaped and hardened replication material establishes the cores of the second waveguides, and wherein the hardened replication material present at and shaped by the further end face structures establish the end faces of the cores of the second waveguides.

This embodiment explains in more detail the manufacture of waveguide structures with two (or more) waveguides each.

In one embodiment related to the first and second waveguides, each of the holding structures comprises a separating structure separating associated first and second waveguides. In particular, each of the separating structures optically separates the associated first and second waveguides in a region located (laterally) between the end faces of the first and second waveguides.

In one embodiment, in the first variant the replication tool and, in the second variant the replication tool wafer is, at least in part, made of a resilient material, in particular made of a polymer material, more particularly made of Polydimethylsiloxane (PDMS).

The invention also comprises waveguide structures, such as waveguide structures manufactured using a method according to the invention. It also specifically comprises a waveguide structure comprising a holding structure and a first and a second waveguides each having a core and two end faces, the holding structure comprising a separation structure being arranged between the first and the second waveguide and providing an optical separation between the first and the second waveguide in a region located between the end faces of the first and second waveguides. In particular, the first and the second waveguides may each have two end sections comprising one of the end faces, and the separation structure provides an optical separation between the first and the second waveguide in a region between the respective end sections. The separation structure is typically established by or even identical with the separation structure described in conjunction with the manufacturing method.

In one embodiment, at least one of the two end faces of at least one of the first and second waveguides is non-planar. In particular, it may establish a lens, more particularly wherein the lens is a refractive lens or a diffractive lens or a refractive-and-diffractive lens.

In one embodiment, the holding structure comprises at least one first holding face which can be planar, wherein a plane comprising the first holding face is devoid any intersection with any one of the first and second waveguides. Such a first holding face can be used for handling the waveguide structure without touching any of the end faces. The plane comprising the first holding face may in particular be aligned perpendicular to a plane comprising main directions of light propagation for light propagating in the first and the second waveguides. With reference to the manufacturing method and the correspondingly defined vertical and lateral directions, the first holding face can be aligned in such a way that it contains a vertical direction.

In one embodiment, the holding structure comprises at least one second holding face which may be planar or may be curved or angled, wherein surfaces comprised in the second holding face can be aligned perpendicularly to the plane containing the first holding face. With reference to the manufacturing method and the correspondingly defined vertical and lateral directions, the second holding face can be either aligned in such a way that it contains a vertical direction, namely in particular in embodiments with the above-described slits (cf. also the "second example" below), or is laterally aligned (containing lateral directions only), namely in particular in embodiments with the above-described base wafer and first tape layer (cf. also the "first example" below).

Some details of the invention, in particular concerning the "second example" described further below, are described in the U.S. provisional application Ser. No. 62/111,708 filed with the USPTO on Feb. 04, 2015. Therefore, said U.S. provisional application having the Ser. No. 62/111,708 is herewith incorporated by reference in the present patent application.

The invention comprises waveguide structures with features of corresponding methods according to the invention, and, vice versa, also methods with features of corresponding waveguide structures according to the invention.

Further embodiments and advantages emerge from the dependent claims and the figures.

Below, the invention is described in more detail by means of examples and the included drawings. The figures show schematically:

FIG. 1 a perspective view of a waveguide structure (first example);

FIG. 2 a cross-sectional illustration of an application of a first tape layer to a base wafer;

FIG. 3 a perspective cross-sectional illustration of a detail of a carrier wafer or of a precursor thereof;

FIG. 4 a perspective cross-sectional illustration of a detail of a coating step applied to the carrier wafer or precursor thereof of FIG. 3;

FIG. 5 a perspective cross-sectional illustration of a detail of a carrier wafer;

FIG. 6 a perspective cross-sectional illustration of a detail of the carrier wafer of FIG. 5 after replication of waveguide cores;

FIG. 7 a perspective illustration of a view onto a cross-section through a tool wafer brought together with the carrier wafer of FIGS. 5, 6 before provision of replication material;

FIG. 8 a perspective cross-sectional illustration of the tool wafer brought together with the carrier wafer of FIGS. 5, 6, 7 before provision of replication material;

FIG. 9 an illustration of a coating step applied to the carrier wafer with waveguide cores of FIG. 6;

FIG. 10 a perspective cross-sectional illustration of a detail of a removal of the first tape layer after application of a second tape layer;

FIG. 11 a perspective view of a precursor of a waveguide structure having protruding material portions;

FIG. 12 a perspective cross-sectional illustration of a detail of waveguide structures obtained from precursors of waveguide structures as illustrated in FIGS. 10, 11 by removal of a portion of a base structure, further illustrating singulation of the waveguide structures;

FIG. 13 a perspective view of waveguide structures (second example);

FIG. 14 a top view onto a precursor of a carrier wafer (second example);

FIG. 15 a top view onto a carrier wafer comprising slits as obtained from the precursor of FIG. 14;

FIG. 16 a cross-sectional illustration of a two-part tool wafer brought together with the carrier wafer of FIG. 15;

FIG. 17 a cross-sectional illustration of the two-part tool wafer brought together with the carrier wafer as shown in FIG. 15 after application of replication material;

FIG. 18 a top view onto a waveguide structures wafer obtained from FIG. 17;

FIG. 19 a detail of a cross-section through the waveguide structures wafer of FIG. 18, in a first embodiment;

FIG. 20 a detail of a cross-section through the waveguide structures wafer of FIG. 18, in a second embodiment;

FIG. 21 a top view onto the waveguide structures wafer of FIG. 18 with separation lines indicated;

FIG. 22 an illustration of a linear arrangement of waveguide structures obtained from the waveguide structures wafer of FIGS. 18, 21 by separation as illustrated in FIG. 21 and after removal of material;

FIG. 23 an illustration of an assembly obtained by application of the linear arrangement of waveguide structures of FIG. 22 to an arrangement of further optical components;

FIG. 24 an illustration of optical devices obtained from the assembly of FIG. 23 by separation;

FIG. 25 a top view onto the waveguide structures wafer of FIG. 18 with separation lines indicated;

FIG. 26 a top view onto a waveguide obtained from the waveguide structures wafer of FIGS. 18, 25 as indicated in FIG. 25;

FIG. 27 a side view of the waveguide of FIG. 26;

FIG. 28 a cross-sectional illustration of a precursor wafer of a multilayer carrier wafer;

FIG. 29 a top view onto the multilayer carrier wafer of FIG. 28 comprising slits;

FIG. 30 a cross-sectional illustration of a two-part tool wafer brought together with the carrier wafer of FIG. 29 before application of replication material;

FIG. 31 a cross-sectional illustration of optical separation due to multilayer carrier wafers like in FIG. 30.

The described embodiments are meant as examples or for clarifying the invention and shall not limit the invention.

All enclosed Figures are schematic. FIG. 1 is a perspective view of a waveguide structure 1 in a first example. Waveguide structure 1 comprises a holding structure 2 and two waveguides 10 and 20, respectively. Holding structure 2 comprises a separation structure 4 separating, e.g., optically separating the waveguides 10 and 20 from each other. It furthermore has two holding faces 2a, 2a' (first holding faces) and two further holding faces 2b, 2b' (second holding faces) which may facilitate handling the waveguide structure 1.

Each of the waveguides 10, 20 comprises a core 11 and 21, respectively, and a cladding 12 and 22, respectively which can comprises two portions each, namely portions 12a and 12c, and portions 22a and 22c, respectively, which are manufactured in separate manufacturing steps, cf. below.

The cores 11, 21 can be manufactured using replication, such that they are made of a replication material, such as of a curable epoxy, in its cured state.

The waveguides 10, 20 have two end faces each, referenced 18, 19 and 28, 29, respectively. In other implementations the waveguides can comprise more than two end faces, such as in the case of Y-shaped waveguides In the manufacturing methods described below, the end faces 18, 19, 28, 29 may be obtained in very high optical quality. They are not produced by cutting, and they do not need to be subjected to a polishing step in order to produce an optically smooth surface. The waveguide structures can furthermore be produced in high numbers on wafer level. The above applies to the first example and also to the second example described further below.

Despite the invention being described with much reference to the first and the second examples and the figures relating to waveguide structures comprising no more than exactly two waveguides, the invention may relate, too, to the case of waveguide structures comprising three or more waveguides and also to waveguide structures comprising no more than a single waveguide.

In the following, the manufacturing method of the first example will be described. Firstly, the manufacture of a carrier wafer will be described.

FIG. 2 is a cross-sectional illustration of an application of a first tape layer 56 to a base wafer 55. Base wafer 55 provides mechanical stability. Tape layer 56 is removably attached to base wafer 55.

Tape layer 56 can, e.g., be a layer of adhesive tape which becomes non-adhesive by exposure to ultraviolet radiation.

FIG. 3 is a perspective cross-sectional illustration of a detail of a carrier wafer 50W or of a precursor thereof. Carrier structures 51 or precursor structures thereof may be manufactured by means of a replication step such as by an embossing process or an injection molding process. The carrier structures 51 may be contiguous or may be separate from each other spaced apart at the locations indicated by the open arrows.

The carrier structures 51 comprise a channel structure 52 comprising indentations. The waveguides to be manufactured may later on be present in the channel structure 52, as will be explained below. The carrier structures 51 comprise separating structures 54 which largely correspond to the separation structures 4 of the finished waveguide structures (cf. FIG. 1).

The carrier structures 51 also comprise base structures 53. They are present between tape layer 56 and the location where the respective waveguides will be located.

In order to produce cladding portions 12a, 22a (cf. FIG. 1), a coating is applied, as is symbolized in FIG. 4 by the cloud of coating material precursor 9'. FIG. 4 is a perspective cross-sectional illustration of a detail of a coating step applied to the carrier wafer or rather to the precursor of a carrier wafer (cf. FIG. 3.). If no coating is applied, the wafer of FIG. 3 is the carrier wafer 50W; if the coating is applied, it is merely a precursor of the carrier wafer.

FIG. 5 is a perspective cross-sectional illustration of a detail of a carrier wafer 50W as obtained by the coating step illustrated in FIG. 4. A coating of coating material 9 is obtained, wherein coating material precursor 9' may be different from (e.g., in case of a chemical vapor deposition process) or identical with (e.g., in case of a metal sputtering process) coating material 9. Coating material 9 may be, e.g., a reflective material such as a metal or may be material having a suitable index of refraction for enabling total internal reflection inside the waveguides 10, 20 to be produced.

The structures at 51 in FIG. 3 may be the carrier structures 51 themselves (and not precursors thereof) in case the material from which they are made has suitable properties, in particular if it provides a sufficient reflectivity and/or has a suitable index of refraction. In this case, a coating may be dispensed with.

In a subsequent step, the waveguide cores 11, 21 (cf. FIG. 1) are produced in a replication process. FIG. 6 is a perspective cross-sectional illustration of a detail of the carrier wafer 51 of FIG. 5 after replication of waveguide cores 11, 21. Embossing may be employed or injection molding, in particular vacuum injection molding.

The replication process and the tools involved will be explained with reference to FIGS. 7 and 8.

Figure 6:
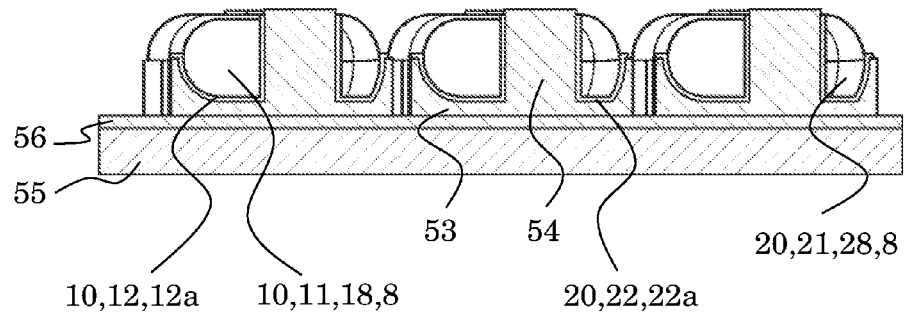
Figure 7:
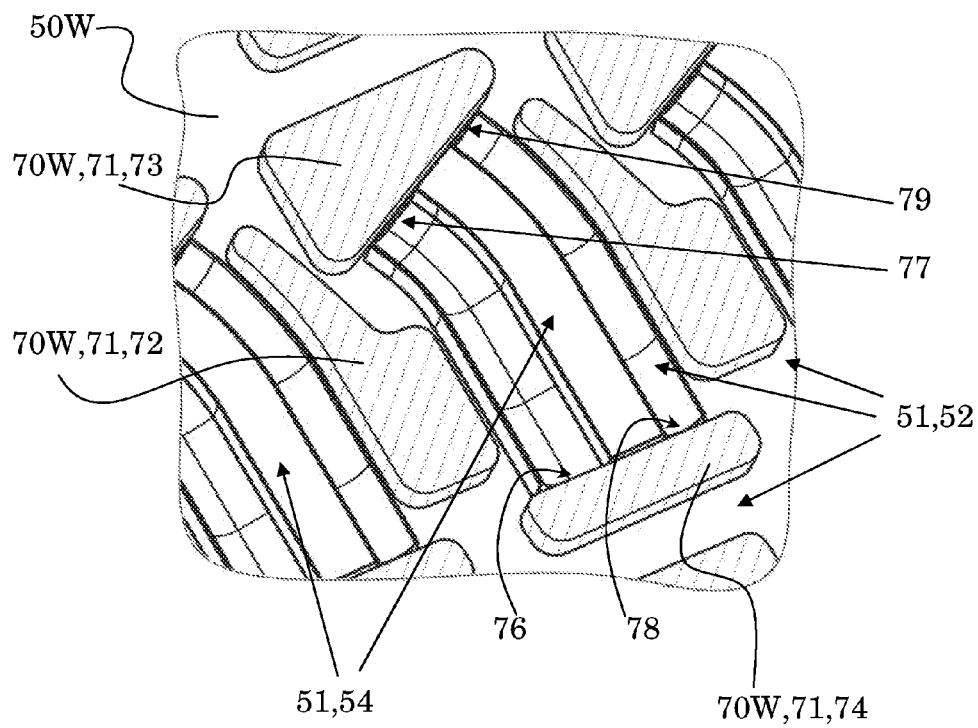
FIG. 7 is a perspective illustration of a view onto a cross-section through a replication tool wafer 70W (or briefly "tool wafer 70W") brought together with the carrier wafer 50W of FIGS. 5, 6 before provision of replication material. The cross-sectional plane is a lateral plane.

In FIG. 7, objects belonging to the tool wafer 70W are drawn with hatching. For reasons of clarity, the cross-section illustrated in FIG. 7 is selected to make invisible such portions of tool wafer 70W which exceed a certain height above the (lateral) plane defined by the base wafer 55 (cf. FIGS. 2-6). Those portions of tool wafer 70W which are illustrated in FIG. 7 are protrusions of tool wafer 70W (more particular of tool structures 71 of tool wafer 70W). Tool structures 71, comprises protrusions 72, 73, 74 extending, during the shaping of a replication for producing the waveguide cores 11, 21, into the channel structure 52 of carrier wafer 50W. Protrusions 73, 74 are protrusions which comprise end face structures 76, 78 and 77, 79, respectively.

Figure 1:
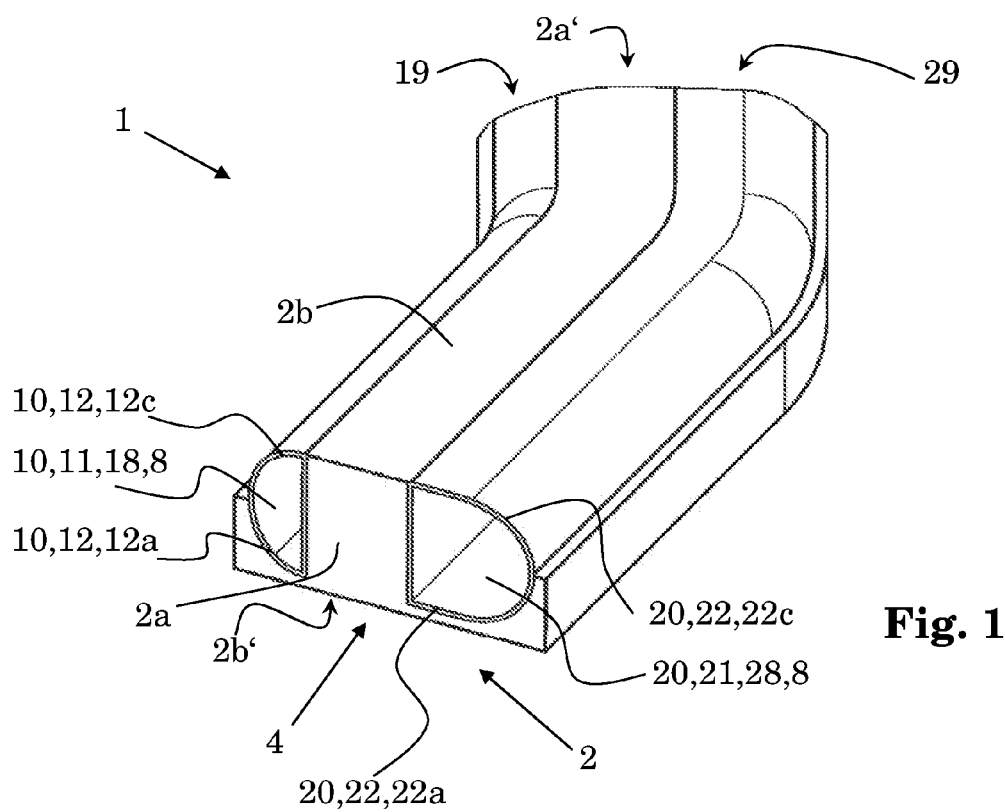
Figure 2:
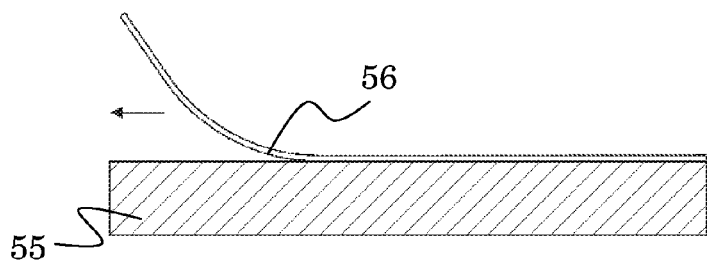
Figure 3:
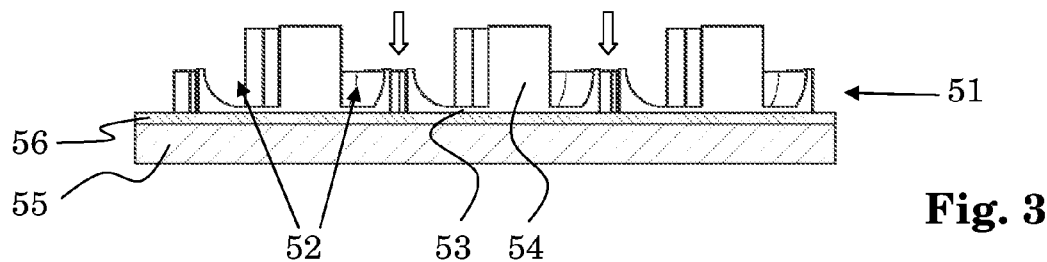
Figure 4:
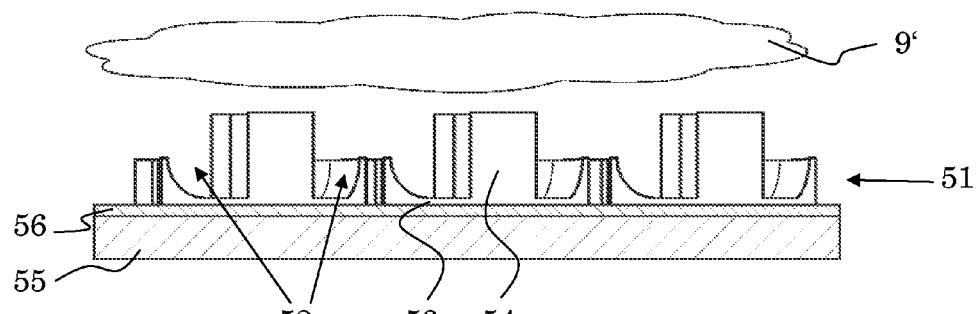
Figure 5:
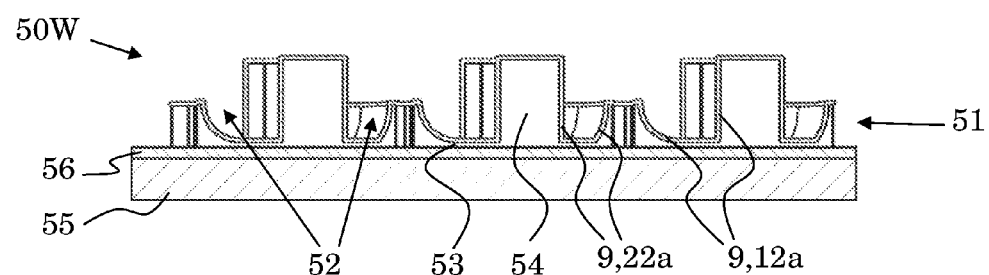

End face 18 is shaped (solely) by end face structure 76, end face 19 is shaped (solely) by end face structure 77, end face 28 is shaped (solely) by end face structure 78, end face 29 is shaped (solely) by end face structure 79 (cf. FIGS. 1 and 7).

Thus, the shape of end faces 17, 18, 27, 28 may in particular be determined solely by the shape of said end face structures (items 76-79). Choosing appropriately shaped end face structures, curved end faces and/or end faces with diffractive structures may be produced. Thus, lenses can be integrated at ends of waveguides.

Figure 8:
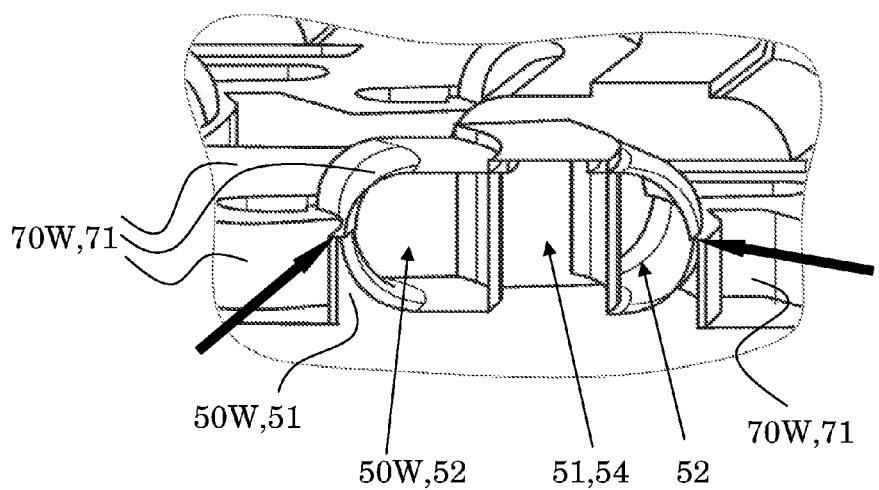
FIG. 8 is a perspective cross-sectional illustration of the tool wafer 70W brought together with the carrier wafer described in FIGS. 5, 6, 7 before provision of replication material, wherein in FIG. 8, only surface are drawn, such that solid portions appear hollow. The cross-sectional plane is a plane containing vertical directions.

In FIG. 8, some locations in which tool wafer 70W (more particularly tool structures 71) is—before and during the shaping of replication material—in contact with carrier wafer 50W (more particularly with carrier structures 51) are indicated with large black arrows pointing at them.

As is clear from the above and from the Figures, carrier wafer 50W and replication tool wafer 70W interact with each other similar as two parts of a replication material such as a mold do. They together define the space in which replication material can be present, and where it can be shaped by wafers 50W and 70W and be hardened. However, replication wafer 70W will be removed from the replication material (e.g., during or after hardening of the replication material), while the replication material will adhere to the carrier structures 51.

FIG. 6 illustrates the situation after removal of the tool wafer 70W. At this point, with the replication material at least partially hardened, the claddings do not yet completely surround their respective waveguide core. Accordingly, another coating process may be applied in order to complete the cladding and thus also the waveguides.

Figure 9:
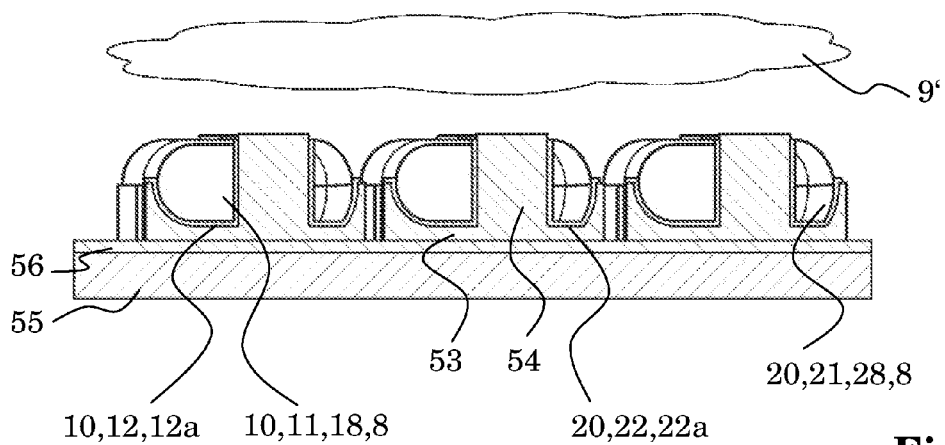

FIG. 9 is an illustration of a coating step applied to the carrier wafer 50W with waveguide cores 11, 21 of FIG. 6. A coating material precursor 9' used in this coating process may be identical with or different from the coating material precursor 9' employed in the earlier coating process (cf. FIG. 4).

Figure 10:
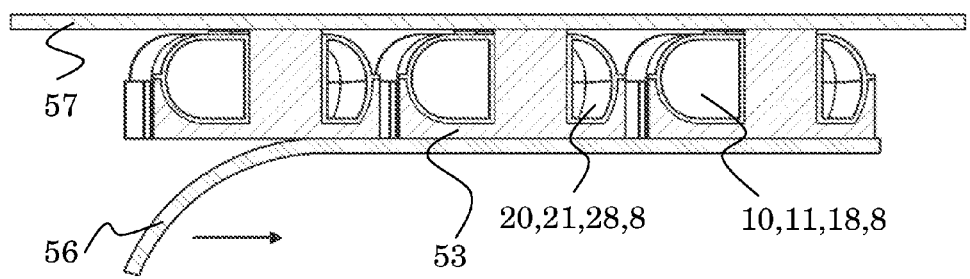

As is illustrated in FIG. 10, another tape layer 57 is applied (attached) to the wafer obtained after the coating step of FIG. 9, and then, the first tape layer 56 which is attached at the opposite side is removed. This way, the structures produced so far are held in place, but the side on which the first tape layer 56 was present before can be accessed and subjected to further processing steps such as to a polishing step.

Figure 11:
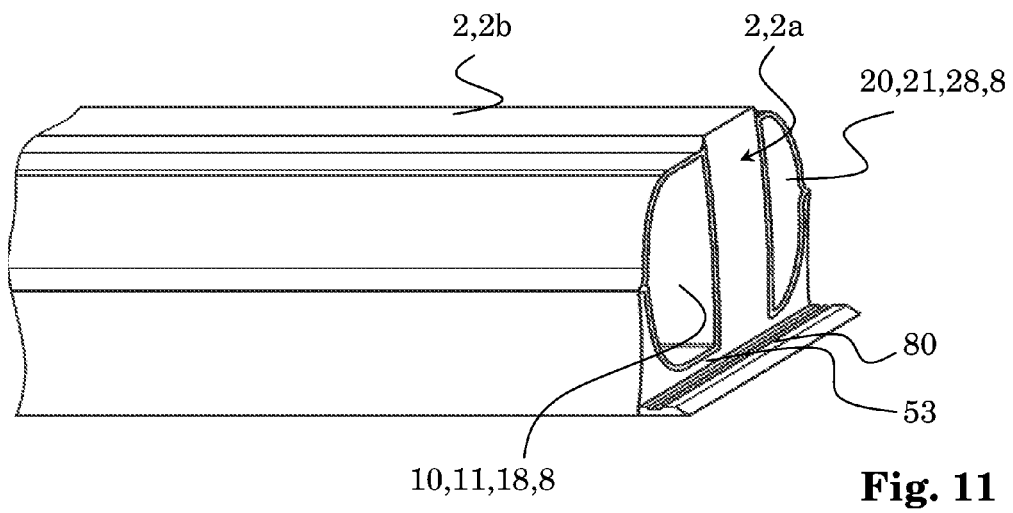

FIG. 11 illustrates a reason why such a processing step may be advisable.

FIG. 11 is a perspective view of a precursor of a waveguide structure having protruding material portions 80. Due to one or more previous processing steps, material portions 80 may be present which protrude beyond end faces of the waveguides such as end faces 18 and 28 in FIG. 11. The protruding material portions 80 at a finished waveguide structure can be removed in some instances, e.g., when one or more further optical components may have to be arranged close to the end faces 18, 28, and said protruding material portions 80 could be an obstacle therefor.

As has been mentioned above already, base structures 53 can be provided for enabling or facilitating a removal of such protruding material portions 80.

With tape layer 57 attached and first tape layer 56 removed, a thickness of the base structure 53 may be removed in a thinning step, e.g., by polishing. In the thinning step, not only the protruding material portions 80 will be thinned and finally removed, but also the thickness of the base structures 53 will be reduced. Therein, it can be provided that the thickness of the base structures 53 is reduced only to an extent that still a portion of the base structures 53 remains. This way, damages of the waveguides 10, 20 through the thinning step can effectively be avoided by the provision of the base structures 53.

For further protection of the waveguides 10, 20 during the thinning step, another coating (protective coating) may be applied to the waveguides (rather: to the wafer) before starting the thinning process. Such a protective coating may optionally be removed again after the thinning step is completed.

Figure 12:
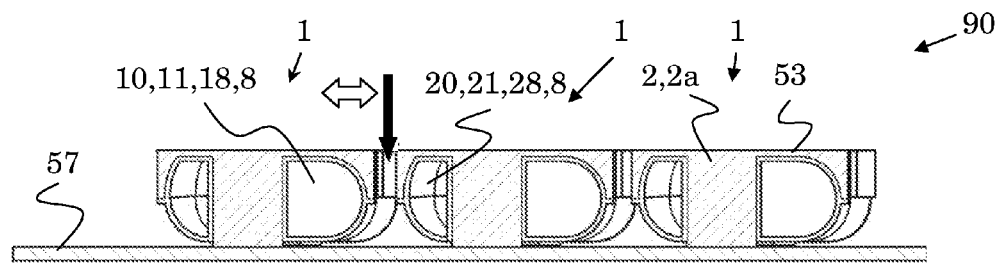

FIG. 12 is a perspective cross-sectional illustration of a detail of a waveguide structures wafer 90 and more particularly of waveguide structures 1 obtained from precursors of waveguide structures as illustrated in FIGS. 10, 11 by removal of a portion of base structures 53, further illustrating singulation of the waveguide structures 1. FIG. 12 illustrates a waveguide structures wafer 90 attached to the second tape layer 57. The black arrow symbolizes that singulation takes place, so as to obtain separate, mutually unconnected waveguide structures 1 like illustrated in FIG. 1. Singulation may be accomplished by, e.g., laser cutting. The open arrow indicates the direction along which singulation takes place. If the base structures 53 are contiguous, singulation will usually have to take place in a lateral direction perpendicular to the direction symbolized by the open arrow.

Even though in the first example above and in the second example below, the replication process for producing the waveguide cores is accomplished with a replication tool wafer (wafer 70W) such that cores 11, 21 of waveguides 10, 20 distributed over the wafer are simultaneously shaped, it is noted that it is also possible to use a tool which is repeatedly applied, so as to produce, e.g., in one of the repeated steps the core(s) of a single waveguide structure only in a single replication step.

In the second example which will be described now, the produced waveguide structure 1 is in many aspects similar to the waveguide structure 1 of the first example (cf. FIG. 1), however, there are differences, for example with respect to the respective manufacturing method.

In U.S. provisional application Ser. No. 62/111,708 filed with the USPTO on Feb. 04, 2015, various aspects of the second example are briefly described. Therefore, said U.S. provisional application Ser. No. 62/111,708 is herewith incorporated by reference in the present patent application.

Figure 13:
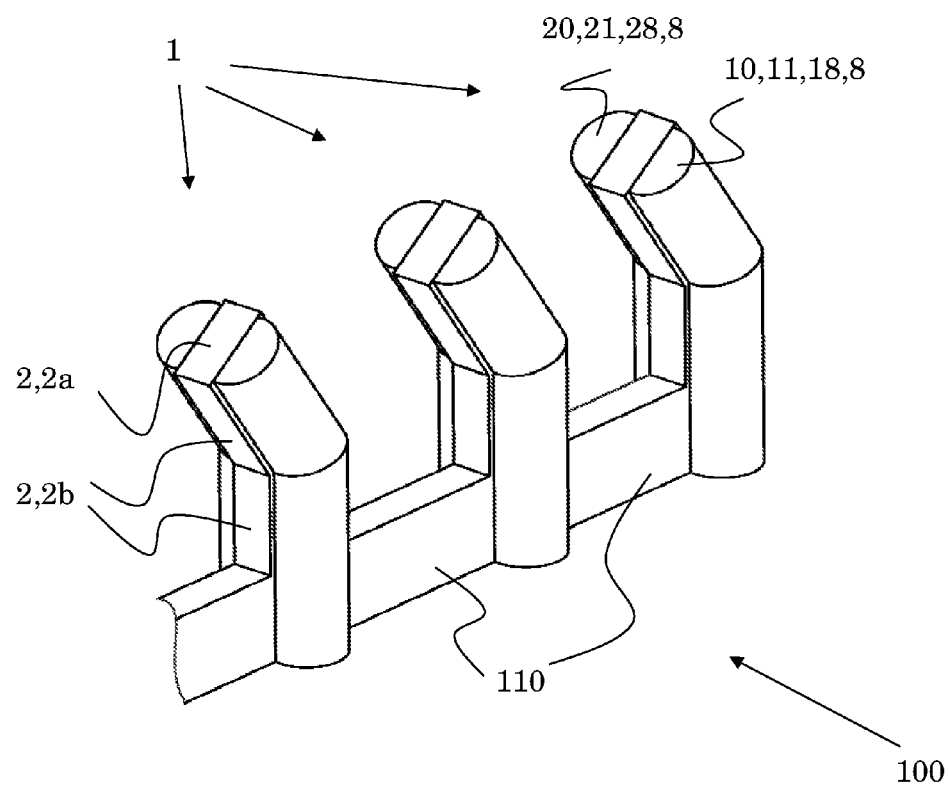

FIG. 13 is a perspective view of waveguide structures 1 of the second example, more particular of an arrangement 100, more particularly of a linear arrangement 100, of waveguide structures 1 which are mutually interconnected by interconnection bars 110.

Each of the waveguides 10, 20 comprises a core 11 and 21, respectively, which are produced using a replication technique and thus are made of a replication material 8. The waveguides 10, 20 can also comprise claddings which are not illustrated in FIG. 13. Their manufacture is not explicitly described but may be accomplished like described in the first example.

Each of the waveguides 1 comprises two waveguide 10, 20 having first ends 18 and 28, respectively, and second end faces (not illustrated in FIG. 13).

The waveguide structures 1 comprise a holding structure 2 each, having first and second holding face 2a, 2b (oppositely arranged first and second holding faces are not illustrated in FIG. 13). The holding structures 2 comprise separation structures.

In the following, the manufacturing method of the second example will be described. Firstly, the manufacture of a carrier wafer will be described.

Figure 14:
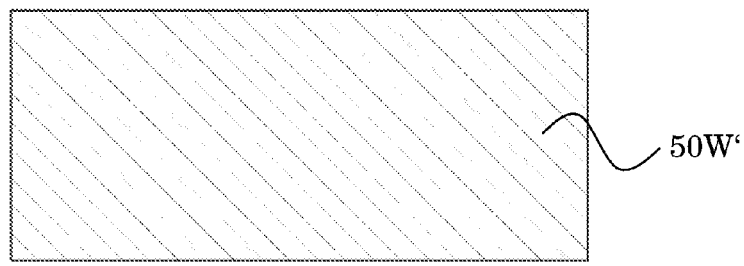

FIG. 14 is a top view onto a precursor 50W' of a carrier wafer. It can be a blank wafer such as a glass (plate) wafer or it can be a wafer made of a non-transparent material.

Figure 15:
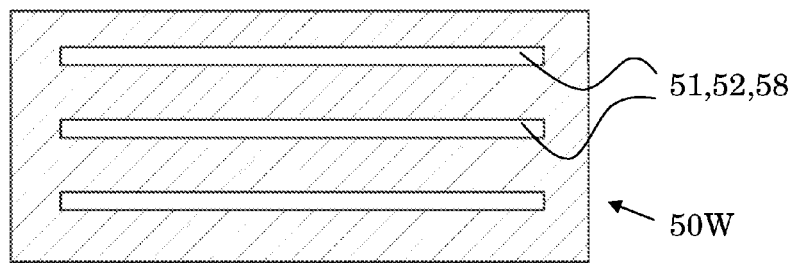

FIG. 15 is a top view onto a carrier wafer 50W comprising slits 58 as obtained from the precursor of FIG. 15 by forming the slits 58 therein, e.g., by laser cutting.

Of course, it is alternatively possible to manufacture carrier wafer 50W differently, e.g., by replication such as by injection molding.

The slits 58 are comprised in a carrier structures 51 establishing a channel structure 52.

Figure 16:
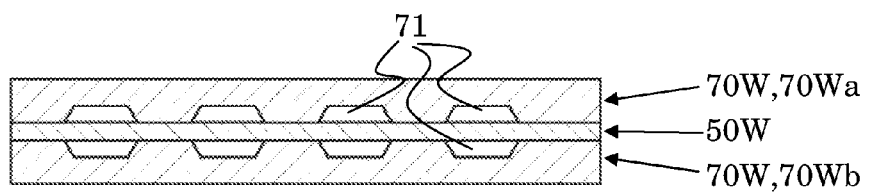

FIG. 16 is a cross-sectional illustration of a two-part tool wafer 70W brought together with the carrier wafer 50W of FIG. 15. Tool wafer 70W comprises two partial wafers 70Wa, 70Wb arranged on opposite sides of carrier wafer 50W. Tool wafer 70W comprises tool structures 71 ensuring that hollows are present when partial wafers 70Wa and 70Wb and carrier wafer 50W are brought together, in particular brought in contact as shown in FIG. 16.

Figure 17:
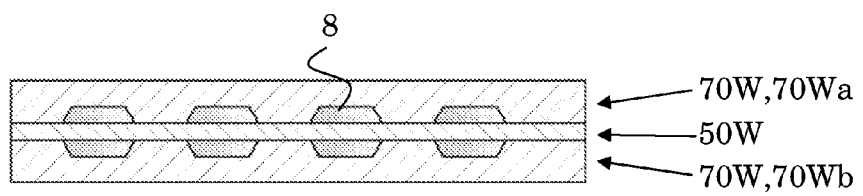

Using dispensing methods or, rather, by application of a vacuum, it is provided that replication material 8 is present between the wafers, cf. FIG. 17.

FIG. 17 is a cross-sectional illustration of the two-part tool wafer 70W brought together with the carrier wafer 50W as shown in FIG. 15, after application of the replication material 8.

Tool structures 71 of tool wafer 70W comprise protrusions protruding into the slits 58.

The partial wafers 70Wa, 70Wb comprise end face structures (not illustrated) for shaping portions of the replication material 8 to become the end faces of the cores 11, 21.

Figure 18:
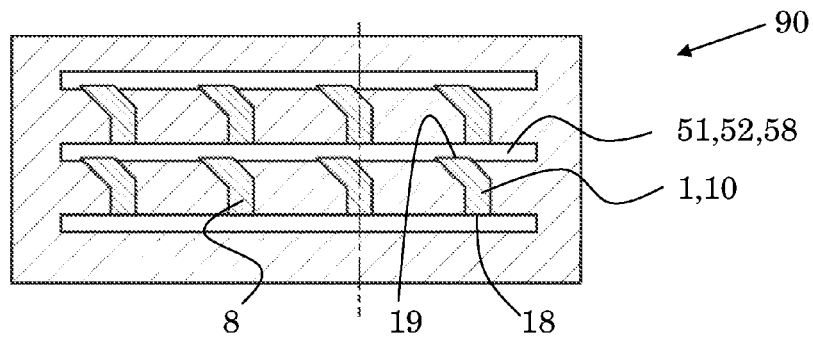

FIG. 18 is a top view onto a waveguide structures wafer 90 obtained from FIG. 17, after hardening of the replication material and removal of tool wafer 70W, i.e. of partial wafers 70Wa, 70Wb. Waveguide structures 1 comprising the waveguides 10, 20 (20 not illustrated) are obtained, each of the waveguides comprising two end faces (end faces 18, 19 being indicated in FIG. 18).

While waveguides 10 are in a plane above the plane of the carrier wafer 50W, waveguides 20 (not visible in FIG. 18) are below the plane of the carrier wafer 50W.

Each of the waveguides extends from one of the slits 58 to another one of the slits 58.

Figure 19:
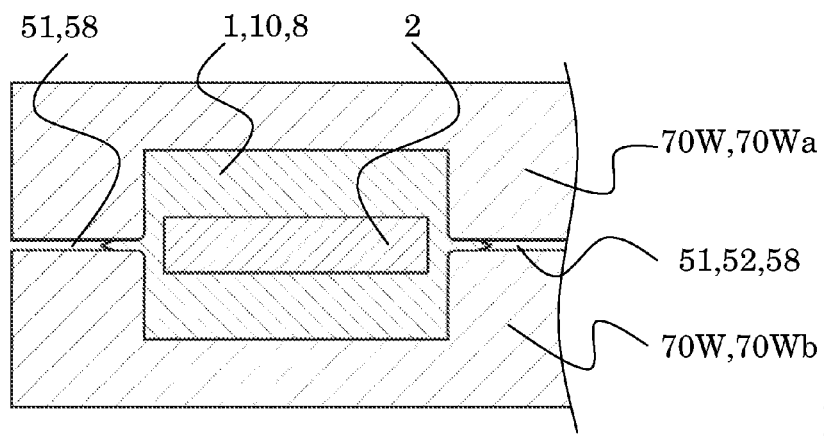

FIG. 19 is a detail of a cross-section through the waveguide structures wafer 90 of FIG. 18, in a first embodiment. The approximate position of the cross-section is indicated in FIG. 18. In this embodiment, the partial wafers 70Wa, 70Wb are symmetrical to each other. As is illustrated in FIG. 19, this is likely that replication material protrusions close to the end faces result from the replication process which can be undesirable, because scattering may take place at those replication material protrusions, or a mutual optical isolation of the two associated waveguides may in other ways be deteriorated by the replication material protrusions.

Figure 20:
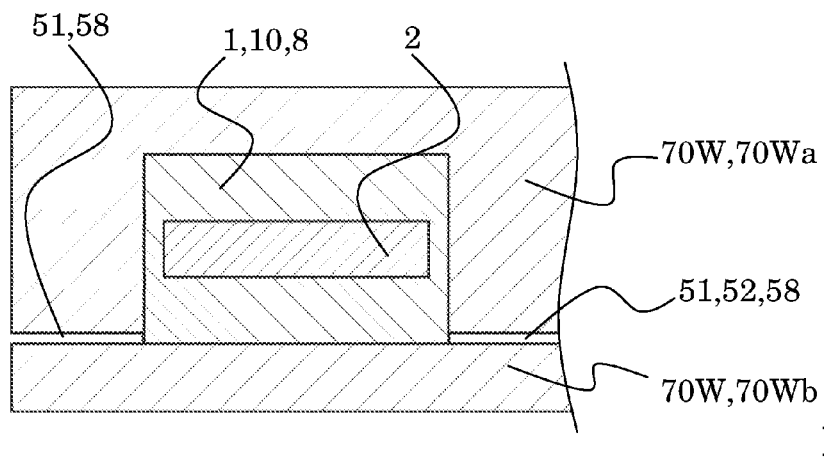

In a second, alternative embodiment, the partial wafer 70Wa, 70Wb are not symmetrical. FIG. 20 illustrates a detail of a portion of a cross-section through the waveguide structures wafer 90 of FIG. 18, in the second embodiment. If replication material protrusions occur in this case, it is less likely that they will deteriorate a mutual optical isolation of the two associated waveguides.

Figure 21:
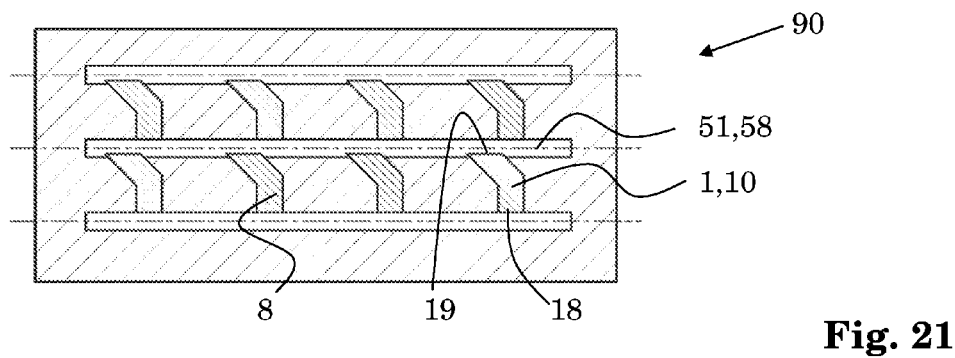

FIG. 21 is a top view onto the waveguide structures wafer 90 of FIG. 18 with separation lines indicated. A separation along these lines does not result in singularized waveguide structures 1 but in linear arrangements of waveguide structures 1.

Figure 22:
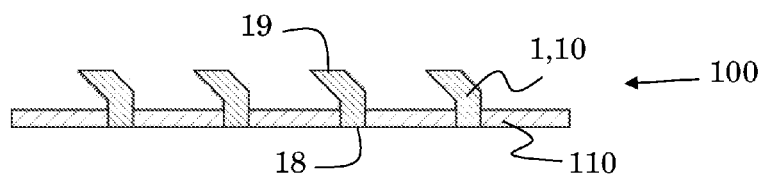

FIG. 22 is an illustration of a linear arrangement 100 of waveguide structures 1 obtained from the waveguide structures wafer 90 of FIGS. 18, 21 by separation as illustrated in FIG. 21 and after removal of material. Some of the material originating from carrier wafer 50W has been removed before or after singulation (cf. FIG. 21) in a region close to the end faces 19, so as to obtain the waveguide structures arrangements 100 illustrated in FIGS. 14 and 22. Such a removal of material is optional.

The arrangements 100 can be attached as a whole to wafers or arrangements of further optical components, thus simplifying corresponding manufacturing steps and/or reducing manufacturing time.

Figure 23:
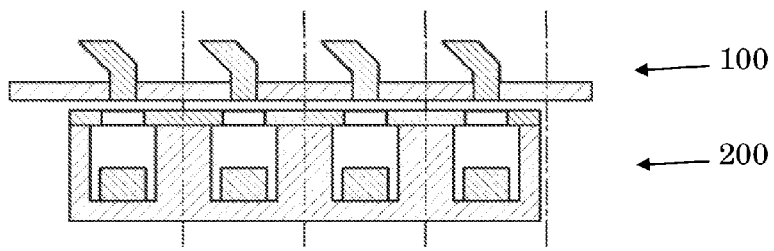

FIG. 23 is an illustration of an assembly obtained by application of the linear arrangement 100 of waveguide structures 1 of FIG. 22 to an arrangement 200 of further optical components, e.g., of opto-electronic modules. After attachment of arrangement 100 to arrangement 200, singulation can take place as illustrated in FIG. 23 and in FIG. 24.

Figure 24:
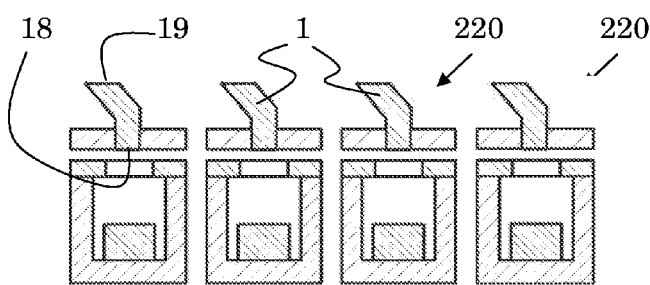

FIG. 24 is an illustration of optical devices 220 obtained from the assembly of FIG. 23 by separation, e.g., by dicing or laser cutting.

Figure 25:
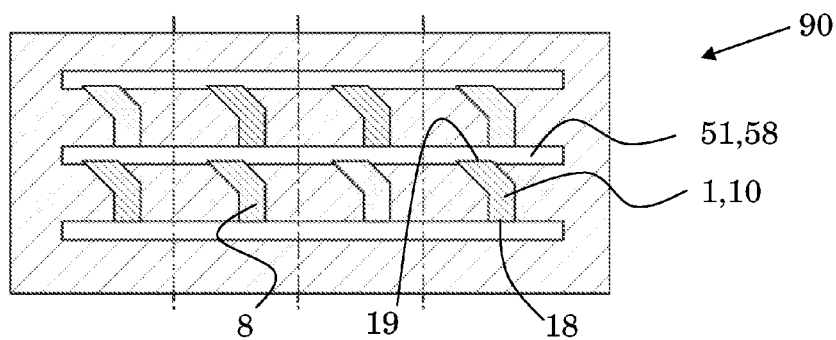

As an alternative to the separating as indicated in FIG. 21, separation may take place as indicated in FIG. 25.

FIG. 25 is a top view onto the waveguide structures wafer 90 of FIG. 18 with separation lines indicated. Separation carried out this way will result in singulized waveguide structures 1.

Figures 26, 27:
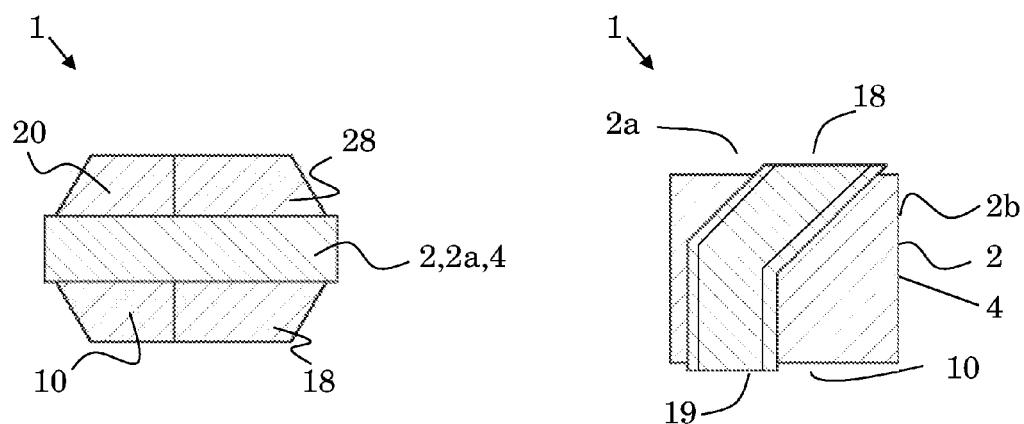

FIG. 26 is a top view onto a waveguide structure 1 obtained from the waveguide structures wafer 90 of FIGS. 18, 25 as indicated in FIG. 25. FIG. 27 is a side view of the waveguide of FIG. 26.

In the following, an alternative to the blank wafer based carrier wafer 50W of FIGS. 14, 15 is described, namely a multilayer wafer which may replace a simple blank wafer.

Figure 28:
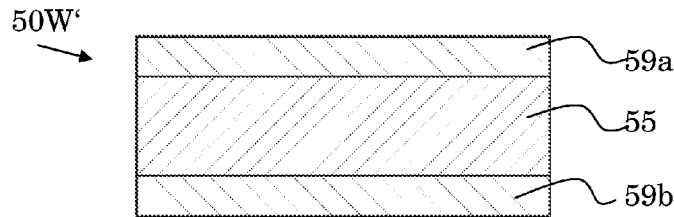

FIG. 28 is a cross-sectional illustration of a precursor 50W' of a multilayer carrier wafer. It comprises a base wafer 55 between two further layers 59a, 59b. The further layers 59a, 59b may function as portions of a cladding of the waveguides. Accordingly, they may be made of a material with a suitably low index of refraction or be reflective. Base wafer 55 may be made of a non-transparent material such as a polymer filled with a filler such as carbon black. This can enhance the optical performance of the produced waveguide structure by reducing sensitivity to flaws, as will be described below with reference to FIG. 31.

Figure 29:
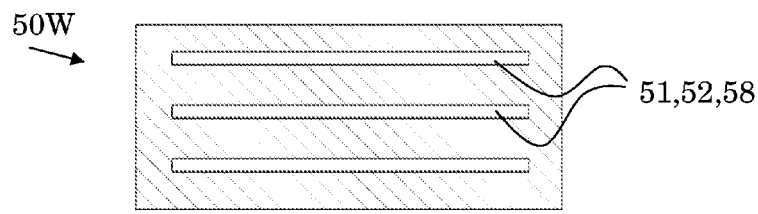

FIG. 29 is a top view onto the multilayer carrier wafer 50W of FIG. 28 comprising slits 58. The corresponding channel structure 52 thus comprises openings extending completely through the carrier wafer 50W. Either base wafer 55 and layers 59a, 59b are firstly stacked and then the slits 58 are produced; or slits are produced in base wafer 55 and layers 59a, 59b before stacking them.

Figure 30:
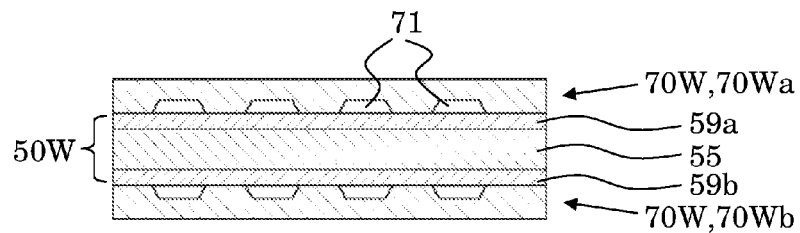

FIG. 30 is a cross-sectional illustration of a two-part tool wafer 70W brought together with the carrier wafer of FIG. 29 before application of replication material.

As is readily understood, further manufacturing steps can be readily transferred from the description above.

Figure 31:
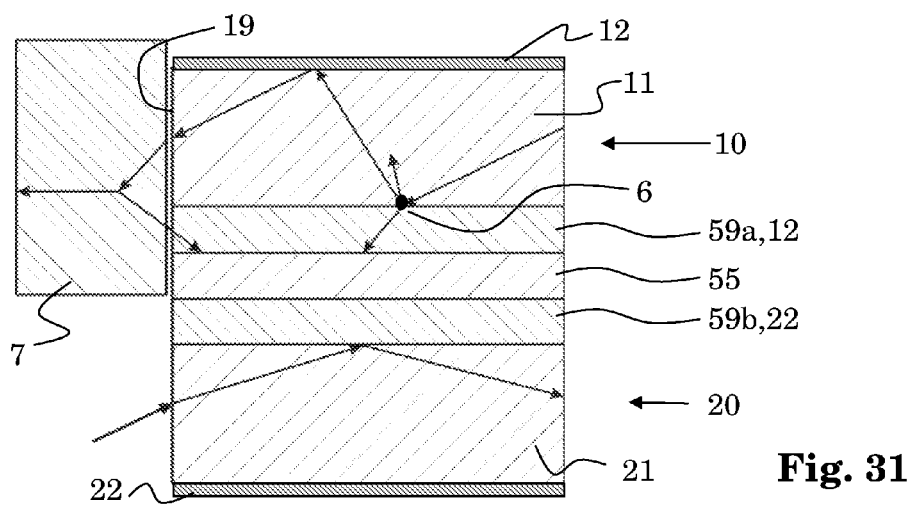

FIG. 31 is a cross-sectional illustration of optical separation between the waveguides of a waveguide structure due to multilayer carrier wafers 90 like in FIG. 30. A flaw 6 present in or adjacent to a waveguide core 10 can result in light scattering enabling light paths leading out of the core 10. However, the provision of a non-transparent base wafer 55 can inhibit a propagation of such scattered light into the second waveguide 20 of the waveguide structure.

In addition, if an external component 7 is placed close to an end face 19 of a waveguide 10, and the external component 7 is able to scatter light incident on the external component, a cross-talk from waveguide 10 to waveguide 20 by such light scattering may be reduced or even be avoided by the provision of the multilayer carrier wafer 50W with a non-transparent base wafer 55.

The invention claimed is:

1. A waveguide structure comprising a holding structure and a first and a second waveguides each having a core and two end faces, the holding structure comprising a separation structure being arranged between the first and the second waveguide and providing an optical separation between the first and the second waveguide in a region between the end faces of the first and second waveguides, wherein each of the waveguides comprises a core and a cladding, each cladding comprising two distinct portions wherein each of the portions only partially encompasses the core, but together the two portions fully encompass the core.

2. The waveguide structure of claim 1, wherein at least one of the two end faces of at least one of the first and second waveguides is non-planar.

3. The waveguide structure of claim 2, wherein at least one of the two end faces of at least one of the first and second waveguides establishes a lens.

4. The waveguide structure of claim 2, wherein the lens is a refractive lens or a diffractive lens or a refractive-and-diffractive lens.

5. The waveguide structure according to claim 1, wherein the holding structure comprises at least one first holding face which is generally planar, wherein a plane comprising the first holding face is devoid any intersection with any one of the first and second waveguides.

6. The waveguide structure of claim 5, wherein the plane comprising the first holding face is aligned parallel to a plane comprising main directions of light propagation for light propagating in the first and the second waveguides.

7. The waveguide structure according to claim 1, wherein light is coupled into or out of the waveguide at the end faces.

8. The waveguide structure according to claim 1, wherein the holding structure comprises at least one first holding face which is planar, wherein a plane comprising the first holding face is devoid any intersection with any one of the first and second waveguides.

9. The waveguide structure according to claim 1, wherein the cores of the first and second waveguides are made of a curable epoxy.

10. The waveguide structure according to claim 1, wherein the holding structure is made of a reflective material or comprise a coating of a reflective material that, in conjunction with the core, is operable as an optical waveguide.

11. The waveguide structure according to claim 1, wherein the holding structure is made of a material having an index of refraction which is lower than an index of refraction of one or both of the core of the first and the core of the second waveguide, and wherein the holding structure establishes at least a portion of the cladding for at least one of the waveguides.

12. The waveguide structure according to claim 1, wherein the cladding comprises a reflective material.

13. The waveguide structure according to claim 1, wherein the cladding comprises a material having an index of refraction which is lower than an index of refraction of the core of the first waveguide.

14. The waveguide structure of claim 1 wherein the two portions of each particular one of the claddings form an interface with one another, the interface extending along a length of a particular one of the waveguides.

15. The waveguide structure of claim 1 wherein the two portions of the cladding are coatings.

16. The waveguide structure of claim 15 wherein the coatings are composed of a same material as one another.

17. The waveguide structure of claim 1 wherein the two portions of each particular one of the claddings are formed in separate manufacturing steps from one another.

18. A waveguide structure comprising a holding structure and a first and a second waveguides each having a core, a cladding and two end faces, the holding structure comprising a separation structure being arranged between the first and the second waveguide and providing an optical separation between the first and the second waveguide in a region between the end faces of the first and second waveguides, wherein at least a portion of the cladding of one or both of the first and second waveguides is established by a part of the holding structure, and wherein said part of the holding structure establishes the cladding being operable to reflect back into the core of the respective waveguide at least some of the light propagating in the waveguide.

19. The waveguide structure of claim 18, wherein the waveguide structure comprises the holding structure in addition to the first and second waveguides.

20. The waveguide structure of claim 18 wherein at least one of the first or second waveguides further includes a coating applied to the core.

21. A waveguide structure comprising a holding structure and a first and a second waveguides each having a core and two end faces, the holding structure comprising a separation structure being arranged between the first and the second waveguide and providing an optical separation between the first and the second waveguide in a region between the end faces of the first and second waveguides, wherein the holding structure is composed of a reflective material or comprises a coating of a reflective material that, in conjunction with the core, is operable as an optical waveguide, without a separate cladding surrounding the core.

22. A waveguide structure comprising a holding structure and a first and a second waveguides each having a core and two end faces, the holding structure comprising a separation structure being arranged between the first and the second waveguide and providing an optical separation between the first and the second waveguide in a region between the end faces of the first and second waveguides, wherein the holding structure is composed of a material having an index of refraction which is lower than an index of refraction of one or both of the core of the first and the core of the second waveguide, wherein at least a part of the holding structure establishes at least a portion of a cladding for at least one of the waveguides, and wherein said part of the holding structure establishes the cladding being operable to reflect back into the core of the respective waveguide at least some of the light propagating in the waveguide.

* * * * *